(12) United States Patent
Burmester et al.

(10) Patent No.: US 8,793,496 B2
(45) Date of Patent: Jul. 29, 2014

(54) SYSTEMS, METHODS, AND COMPUTER PROGRAM PRODUCTS FOR SECURE OPTIMISTIC MECHANISMS FOR CONSTRAINED DEVICES

(75) Inventors: Mike Burmester, Tallahassee, FL (US); Breno de Medeiros, Tallahassee, FL (US); Tri Van Le, Cupertino, CA (US); Christy Chatmon, Tallahassee, FL (US)

(73) Assignee: Florida State University, Tallahassee, FL (US)

( * ) Notice: Subject to any disclaimer, the term of this patent is extended or adjusted under 35 U.S.C. 154(b) by 1657 days.

(21) Appl. No.: 11/841,488

(22) Filed: Aug. 20, 2007

(65) Prior Publication Data

US 2014/0019759 A1 Jan. 16, 2014

Related U.S. Application Data

(60) Provisional application No. 60/822,765, filed on Aug. 18, 2006.

(51) Int. Cl.
*H04L 29/06* (2006.01)

(52) U.S. Cl.
USPC ........... 713/172; 713/168; 713/169; 713/170; 726/27; 726/28; 726/29; 726/30

(58) Field of Classification Search
USPC ....................................................... 713/172
See application file for complete search history.

(56) References Cited

U.S. PATENT DOCUMENTS

| | | | |
|---|---|---|---|
| 5,657,390 A * | 8/1997 | Elgamal et al. | 713/151 |
| 6,505,301 B1 | 1/2003 | Matyas et al. | |
| 6,505,302 B1 | 1/2003 | Matyas et al. | |
| 2005/0033995 A1 * | 2/2005 | Lin et al. | 713/202 |

\* cited by examiner

*Primary Examiner* — Longbit Chai
(74) *Attorney, Agent, or Firm* — Sutherland Asbill & Brennan LLP

(57) ABSTRACT

Embodiments of the invention may provide for systems and methods for secure authentication. The systems and methods may include receiving, by a constrained device, a random string transmitted from a server; determining, by the constrained device, a responsive output by evaluating a first deterministic function based upon the received random string, a locally generated string and a first private key stored on the constrained device; and transmitting at least one portion of the responsive output and the locally generated string from the constrained device to a server. The systems and methods may also include determining, by the server, a validation output by evaluating a second deterministic function based upon the random string, the locally generated string, and a second private key of a plurality of private keys stored on the server; and authenticating the constrained device based upon the server matching the transmitted at least one portion of the responsive output to at least a portion of the validation output.

18 Claims, 5 Drawing Sheets

SYSTEMS, METHODS, AND COMPUTER PROGRAM PRODUCTS FOR SECURE OPTIMISTIC MECHANISMS FOR CONSTRAINED DEVICES

RELATED APPLICATION

The present application claims the benefit of U.S. Provisional Application No. 60/822,765, filed Aug. 18, 2006, and entitled "Systems, Methods, and Computer Program Products for Secure Optimistic Mechanisms for Constrained Devices," which is hereby incorporated by reference in its entirety as if fully set forth herein.

STATEMENT OF GOVERNMENT INTEREST

The work that led to this invention has been supported in part by a grant from the National Science Foundation, Contract Nos. CNS 0087641 and CNS 0209092. Thus, the United States Government may have certain rights to this invention.

FIELD OF THE INVENTION

Aspects of an embodiment of the invention relate generally to authentication mechanisms, and more particularly, to authentication mechanisms for constrained devices, including but not limited to, radio frequency identification (RFID) devices/tags, near field communication (NFC) devices/tags, wireless sensor nodes, smart cards, and the like.

BACKGROUND OF THE INVENTION

Radio frequency identification (RFID) devices/tags are small electronic devices that include a chip and an antenna. The chip is typically capable of carrying a small amount of data. RFID devices/tags can be powered or passive devices. If the RFID device/tag is powered, then it may include a power source such as a battery. On the other hand, if the RFID device/tag is passive, then it may be powered by a reader's radio waves with the antenna doubling as a source of inductive power. RFID devices/tags may also combine both inductive and battery power sources, in which case they may be termed semi-passive. Generally, RFID devices/tags can operate with a range of up to 20 feet or more.

Similar to RFID devices/tags, near field communication (NFC) devices/tags may also include a small chip and antenna. Generally, NFC devices/tags are short-range wireless technology that enable the communication between devices over a short distance, perhaps in the range of zero to twenty centimeters. NFC devices/tags are generally powered by magnetic field induction.

Current RFID and NFC devices/tags used in tracking, identification, and anti-counterfeiting applications do not support strong, secure security mechanisms, and accordingly are vulnerable in the systems that deploy them. In addition, RFID and NFC devices/tags typically have extremely limited computational capabilities. Accordingly, traditional distributed multi-party computation techniques for securing communication protocols are not feasible for use with these RFID and NFC devices/tags.

SUMMARY OF THE INVENTION

According to an embodiment of the invention, there is a method for secure authentication. The method may include receiving, by a constrained device, a random string transmitted from a server; determining, by the constrained device, a responsive output by evaluating a first deterministic function based upon the received random string, a locally generated string and a first private key stored on the constrained device; and transmitting at least one portion of the responsive output and the locally generated string from the constrained device to a server. The method may also include determining, by the server, a validation output by evaluating a second deterministic function based upon the random string, the locally generated string, and a second private key of a plurality of private keys stored on the server; and authenticating the constrained device based upon the server matching the transmitted at least one portion of the responsive output to at least a portion of the validation output.

According to another embodiment of the invention, there is a system for a secure authentication. The system may include a wireless constrained device that includes an antenna, a first memory for storing first computer-executable instructions, and a first processor in communication with the antenna and memory. The first processor may be operable to execute the first computer-executable instructions to receive a random string, determine a responsive output by evaluating a first deterministic function based upon the received random string, a locally generated string, and a first private key stored on the constrained device, and transmit at least one portion of the responsive output and the locally generated string. The system may also include a server having a second memory for storing second computer-executable instructions, and a second processor in communication with a reader/interrogator and the second memory. The second processor may be operable to execute the second computer-executable instructions to transmit the random string to the constrained device, receive the at least one portion of the responsive output and the locally generated string transmitted from the constrained device, determine a validation output by evaluating a second deterministic function based upon the random string, the locally generated string, and a second private key of a plurality of private keys stored in the second memory, and authenticate the constrained device based upon the received at least one portion of the responsive output matching at least a portion of the validation output.

According to yet another embodiment of the invention there is an authentication method. The authentication method may include receiving, at a wireless constrained device, a random string broadcast from a server via a reader, retrieving a locally generated string at the wireless constrained device, and determining an output for a message authentication code (MAC) function or a pseudo-random function (PRF) based upon at least the received random string, a locally generated string, and a private key stored on the wireless constrained device. The authentication method may also include transmitting at least one portion of the MAC function or PRF output and the locally generated string from the constrained device to the server, wherein validation of the constrained device occurs by the server determining the private key stored on the wireless constrained device and verifying the received at least one portion of the MAC function or PRF output based upon the random string, the locally generated string, and the determined private key.

BRIEF DESCRIPTION OF THE SEVERAL VIEWS OF THE DRAWING(S)

Reference will be made to the accompanying drawings, which are not necessarily drawn to scale, and wherein.

DETAILED DESCRIPTION OF THE INVENTION

Figure 1:
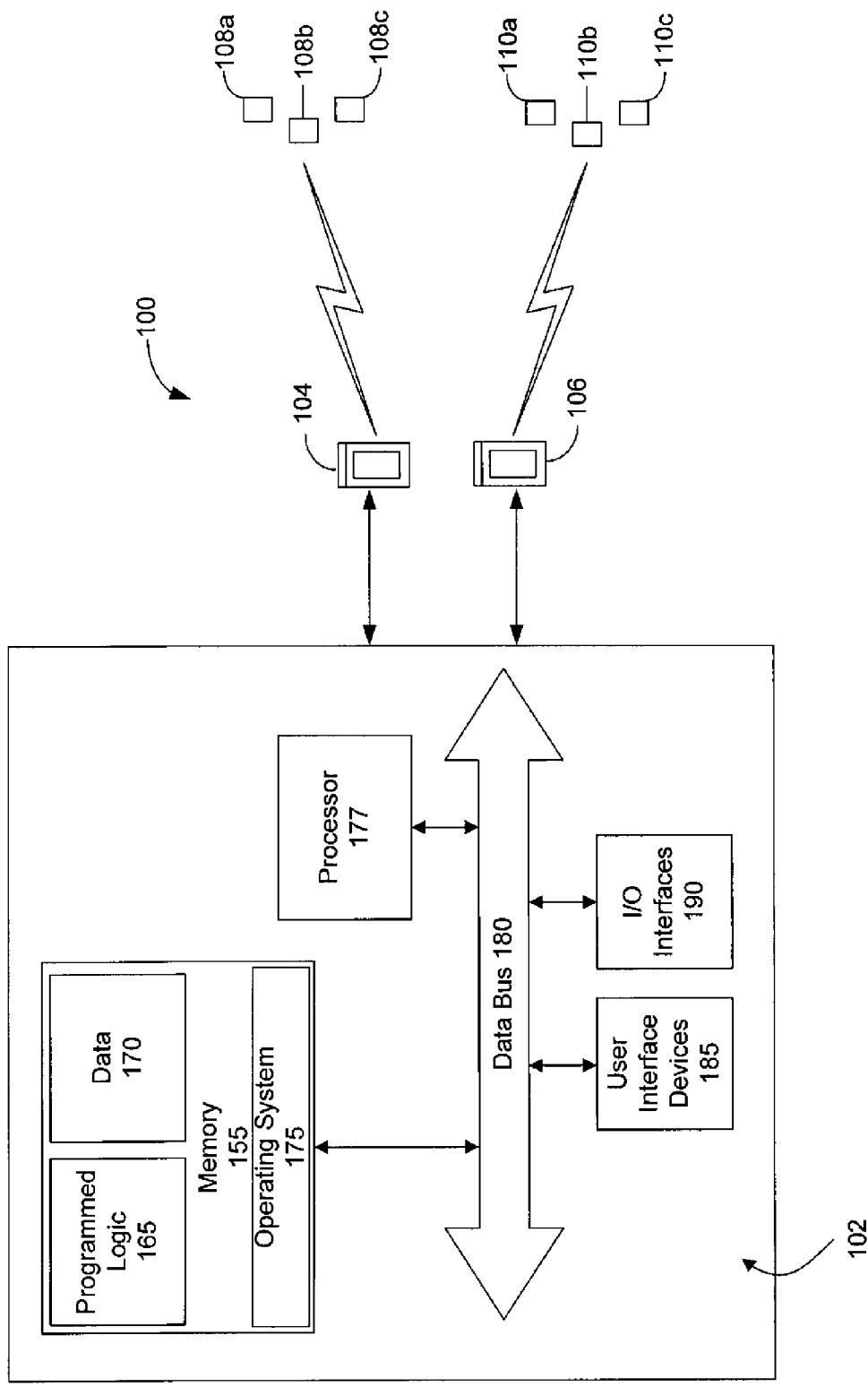
FIG. 1 illustrates a system diagram according to an example embodiment of the present invention.

Embodiments of the present invention will now be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As will be appreciated by one of ordinary skill in the art, upon reading the following disclosure, the present invention may be embodied as a method, a data processing system, or a computer program product. Accordingly, the present invention may take the form of a hardware embodiment, a software embodiment or an embodiment combining software and hardware aspects. Furthermore, the present invention may take the form of a computer program product on a computer-readable storage medium having computer-readable program code means embodied in the storage medium. Any suitable computer readable storage medium may be utilized including hard disks, CD-ROMs, optical storage devices, or magnetic storage devices.

The present invention is described below with reference to flow diagram illustrations of methods, apparatus (i.e., systems) and computer program products according to an embodiment of the invention. It will be understood that one or more block of the flow diagram illustrations, and combinations of blocks in the flow diagram illustrations can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flow diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flow diagram illustrations support combinations of means for performing the specified functions, combinations of steps for performing the specified functions and program instruction means for performing the specified functions. It will also be understood that each block of the flow diagram illustrations, and combinations of blocks in the flow diagram illustrations, can be implemented by special purpose hardware-based computer systems which perform the specified functions or steps, or combinations of special purpose hardware and computer instructions.

Example embodiments of the invention may provide for lightweight and secure mechanisms and protocols for authentication of constrained devices. According to an example embodiment of the invention, these constrained devices can include one or both of Radio frequency identification (RFID) devices/tags or Near Field Communication (NFC) devices/tags. It will be appreciated, however, that other constrained devices with limited processing, memory storage, and/or power supply may be utilized without departing from embodiments of the invention. For example, other constrained devices may include wireless sensor nodes and smart cards. It will be appreciated that while the following embodiments of the invention may be discussed with respect to RFID and NFC devices/tags, the invention is equally applicable to other constrained devices as well.

In accordance with example embodiments of the invention, the lightweight and secure mechanisms and protocols described herein may allow wireless constrained devices to be applied to a variety of tracking and identification applications. For instance, RFID devices/tags and NFC devices/tags can be used to determine the contents of shipping containers, shopping carts, and the like. Likewise, RFID devices/tags and NFC devices/tags are small enough to be printed in materials such as passports for providing identifying information.

In addition to automatic tracking and identification applications, the RFID devices/tags and NFC devices/tags may be used to guarantee authenticity of products and to prevent counterfeiting, e.g., by embedding RFID devices/tags in drug labels and car license plates. They can also employed to automate payments in wave-to-pay credit cards and in automated road toll booths, to provide access control to physical areas such as restricted airport areas, to control access to resources, including keyless car entry systems, and to tag items against shoplifting.

Furthermore, the RFID devices/tags and NFC devices/tags may be utilized in concurrent presence applications (also called "yoking" or "group scanning") that determine whether a particular RFID device/tag or NFC device/tag is located within a particular area at the present time. Concurrent presence applications may be useful in identification and military applications, including for example, to prevent a gun from being used unless it is within a particular distance from the soldier's torso. It will be appreciated that while automatic tracking, identification, counterfeiting, and concurrent presence applications have been described for illustrative purposes, other applications of the lightweight and secure mechanisms and protocols described herein for constrained devices are available without departing from example embodiments of the invention.

I. System Overview

FIG. 1 illustrates an example embodiment of the invention for providing lightweight authentication mechanisms and protocols for constrained devices. As shown in FIG. 1, there is a trusted server 102 that transmits data to one or more RFID devices/tags 108a-c or NFC devices/tags 110a-c via one or more readers/interrogators 104, 106. RFID devices/tags 108a-c or NFC devices/tags 110a-c in the range of one or more readers/interrogators 104, 106 may be operative to receive the data (e.g., via an antenna) transmitted from the trusted server 102. Likewise, the RFID devices/tags 108a-c or NFC devices/tags 110a-c may transmit data to the readers/interrogators 104, 106, and the data received by the readers/interrogators 104, 106 will be provided to the trusted server 102. In particular, the RFID devices/tags 108a-c or NFC devices tags 110a-c may include a processor/chip in communication with an antenna and a memory that includes computer program instructions and data. The processor/chip may be operable to execute the computer program instructions to perform one or more processing and/or communications operations described herein.

Each of the RFID devices/tags 108a-c or NFC devices/tags 110a-c may include individual private keys $K_i$ stored in a memory, which are generally shared or synchronized with the trusted server 102. According to an embodiment of the invention, the trusted server 102 may know which private keys $K_i$ are stored on which RFID devices/tags 108a-c or NFC devices/tags 110a-c. According to an embodiment of the invention, a private key can be a value or password comprising one or more characters, such as an alphanumeric or a binary string. In alternative embodiments of the invention, instead of having the trusted server 102 generate all the communication data, some of the data may be generated by the readers/interrogators 104, 106 and then communicated to both the trusted server 102 and the RFID devices/tags 108a-c and NFC devices/tags 110a-c. By allowing the readers/interrogators 104, 106 to generate some of the communicated data, some of the contention and/or congestion associated with the trusted server 102 may be alleviated.

Still referring to FIG. 1, the trusted server 102 may include a memory 155 that stores programmed logic 165 in accordance with an embodiment of the present invention. The programmed logic 165 may include one or more modules for initiating, receiving, validating, and/or responding to communications with RFID devices/tags 108a-c and NFC devices/tags 110a-c, as well as other methodologies, or combinations thereof, described herein. For example, the programmed logic 165 may include, but is not limited to, one or more pseudo-random functions described herein. The memory 155 may include data 170 that may be utilized in the operation of the invention and an operating system 175. According to an example embodiment of the invention, the data 170 may include one or more random strings and/or calculated pseudo-random outputs, including portions thereof, that are generated by the trusted server 102, the RFID devices/tags 108a-c, and/or NFC devices/tags 110a-c. Additionally, the data 170 may optionally include identification information for RFID devices/tags 108a-c or NFC devices/tags 110a-c. It will be appreciated that while the examples of data 170 described above are provided for illustrative purposes, other examples and types of data 170 may be available without departing from example embodiments of the invention. A processor 177 may utilize the operating system 175 to execute the programmed logic 165, and in doing so, may also utilize (e.g., store, modify, update, and/or retrieve) the data 170.

A data bus 180 may provide communication between the memory 155 and the processor 177. Users, such as authorized users of the trusted server 102, may interface with the trusted server 102 via a user interface device(s) 185 such as a keyboard, mouse, control panel, display, microphone, speaker, or any other devices capable of communicating information to or from the trusted server 102. The trusted server 102 may be in communication with other external devices, including readers/interrogators 104, 106, via one or more Input/Output (I/O) Interface(s) 190. According to an embodiment of the invention, the I/O interface(s) 190 may include a universal serial bus (USB) port, a firewire port, a wireless network card, a wire-based network card, a parallel port, a bluetooth network adapter, a short messaging service (SMS) network card, a modem, and the like. Thus, it will be appreciated that the readers/interrogators 104, 106 may be in communication with the I/O Interface(s) 190 of the trusted server 102 via one or more wired connections or wireless connections. Furthermore, while not illustrated in FIG. 1, there may be one or more networks, either public or private, that connect the trusted server 102 with the readers/interrogators 104, 106.

The trusted server 102 may be a personal computer, mainframe computer, minicomputer, a dedicated server, any other computer device, or any combination thereof without departing from example embodiments of the present invention. It will be appreciated that while a single trusted server 102 is illustrated in FIG. 1, there may be multiple trusted servers 102 in accordance with example embodiments of the invention. According to an example embodiment of the invention, each trusted server 102 may be operable with only a portion of the RFID devices/tags 108a-c and NFC devices/tags 110a-c. For example, a first trusted server 102 may communicate only with RFID devices/tags 108a-c via one or more readers/interrogators 104. A second trusted server 102 may then communicate only with NFC devices/tags 110a-c via one or more readers/interrogators 106. Alternatively, according to another embodiment of the invention, one or more of the trusted servers 102 may be redundant or otherwise provide extra processing capacity to allow for more throughput and data handling capabilities. It will also be appreciated that while RFID devices/tags 108a-c and NFC devices/tags 110a-c have been provided as examples of constrained devices, yet other examples of constrained devices are available in other embodiments of the invention.

II. Operational Methodology of Trusted Server with Constrained Devices

Figure 2:
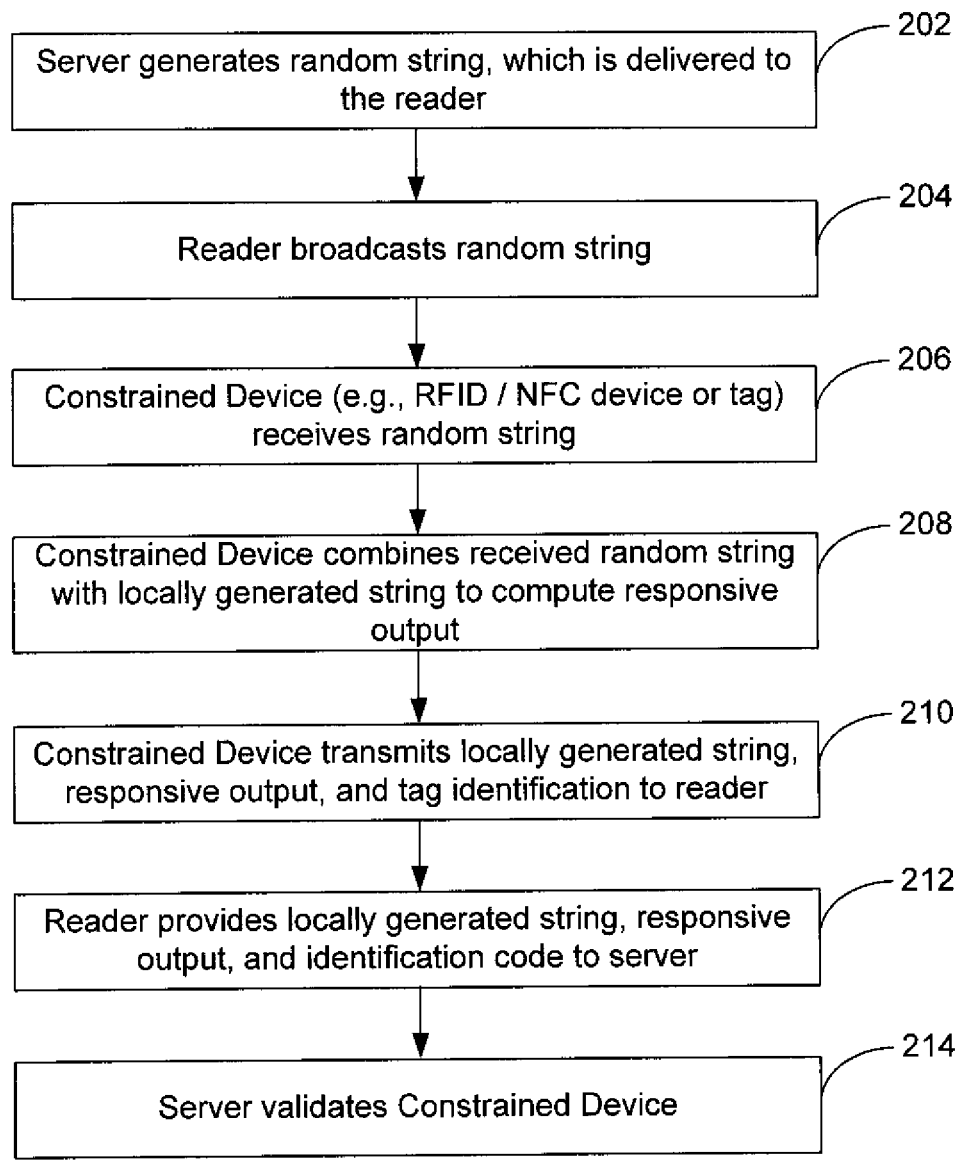
FIG. 2 illustrates an example flow diagram for an authentication protocol for constrained devices that do not require anonymity, according to an example embodiment of the invention.

FIG. 2 illustrates an example flow diagram for an authentication protocol for constrained devices such as RFID devices/tags 108a-c or NFC devices/tags 110a-c that do not require anonymity. Referring to FIG. 2, the server 102 generates a random string $r_{sys}^t$ and delivers the random string to one or more of the readers/interrogators 104, 106 (block 202). In an example embodiment of the invention, the random string $r_{sys}^t$ may be an alphanumeric or binary string, generated by one or more random or pseudo-random generators, including a hash function. One or more readers/interrogators 104, 106 may transmit or broadcast the random string $r_{sys}^t$ (block 204). One or more of the RFID devices/tags 108a-c or NFC devices/tags 110a-c in the range of the readers/interrogators 104, 106 may receive the random string $r_{sys}^t$ (block 206). It will be appreciated that the value of the random string $r_{sys}^t$ transmitted or broadcasted by the server 102 may be updated periodically. For example, if the server 102 is expected to poll or interrogate one or more RFID devices/tags 108a-c or NFC devices/tags 110a-c at a rate of once per minute, then the value of the random string $r_{sys}^t$ may be updated at least once per minute.

As illustrated in block 208, the RFID device/tag 108a-c or NFC device/tag 110a-c may retrieve a locally generated string $r_i$, which as described below is also updated periodically, and combine it with the received random string $r_{sys}^t$ in calculating a message authentication code (MAC) as a responsive output $h_O$. More precisely, the responsive output $h_O$ may be determined according to $h_O = F_{K_i}(r_{sys}^t, r_i)$ where $K_i$ is the private key stored with the respective RFID device/tag 108a-c or NFC device/tag 110a-c and $F_{K_i}(\bullet)$ may be a deterministic function, including a member function of a MAC function family. According to an embodiment of the invention, a MAC function may be formed of cryptographic primitives, such as cryptographic hash functions (e.g., HMAC) or from block cipher algorithms (e.g., OMAC, CBC-MAC and PMAC). It will be appreciated that the value of the responsive output $h_0$ may be calculated by the RFID device tag 108a-c or NFC device/tag 110a-c using simple arithmetic operations or computationally inexpensive operations, according to an example embodiment of the invention.

In block 210, the RFID device/tag 108a-c or NFC device/tag 110a-c may transmit at least the locally generated string $r_i$, the calculated responsive output $h_0$, and its respective identification code (e.g., an identification tag for the RFID device/tag 108a-c or NFC device/tag 110a-c) to the reader/interrogators 104, 106 in its vicinity. The reader/interrogators 104, 106 may then provide the received data (e.g., locally generated string $r_i$, the calculated responsive output $h_0$, and respective identification code) to the server 102 (block 212). After the transmission by the RFID device/tag 108a-c or NFC device/tag 110a-c to the reader/interrogators 104, 106, the value of the locally generated string $r_i$ stored in the RFID device/tag 108a-c or NFC device/tag 110a-c may then be updated according to $r_i = F_{K_i}(r_i)$. According to an embodiment of the invention, $F_{K_i}(\bullet)$ may be a member function of a MAC function family, as described above. Accordingly, as provided by $r_i = F_{K_i}(r_i)$, the value of the new locally generated string may be a function of the value of the previous locally generated string. According to another embodiment of the invention, the locally generated string may be updated based upon information (e.g., an algorithm) shared between the RFID device/tag 108a-c or NFC device/tag 110a-c and the server 102.

As shown in block 214, the server 102 may attempt to validate the RFID device/tag 108a-c or NFC device/tag 110a-c that transmitted the locally generated string $r_i$, the responsive output $h_0$, and its respective identification code. In particular, using the received tag identification, the server 102 can determine which private key $K_i$, was used by the RFID device/tag 108a-c or NFC device/tag 110a-c to compute the received responsive output $h_0$. According to an example embodiment of the invention, the server 102 may maintain a lookup table which provides a cross reference between identification codes and private keys $K_i$ for the respective RFID devices/tags 108a-c or NFC devices/tags 110a-c. Once the server 102 determines the appropriate private key $K_i$, the server 102 may verify the received responsive output $h_0$ by calculating its own validation output $h_1$ according to $h_1 = F_{K_i}(r_{sys}{}^t, r_i)$, where function $F_{K_i}(\bullet)$ may correspond to the same function for the respective RFID device/tag 108a-c or NFC device/tag 110a-c, the random string $r_{sys}{}^t$ was the string transmitted or broadcasted by the server 102, and the locally generated string $r_i$ was received from the respective RFID device/tag 108a-c or NFC device/tag 110a-c. Accordingly, if the value of the received responsive output $h_0$ matches the value of the validation output $h_1$ calculated by the server 102, then the RFID device/tag 108a-c or NFC device/tag 110a-c may be considered validated, as illustrated in block 212. In addition, the server 102 may also store an indication that the RFID device/tag 108a-c or NFC device/tag 110a-c has been validated for purposes of tracking, identification, anti-counterfeiting, concurrent presence applications, and yet other applications.

Figure 3:
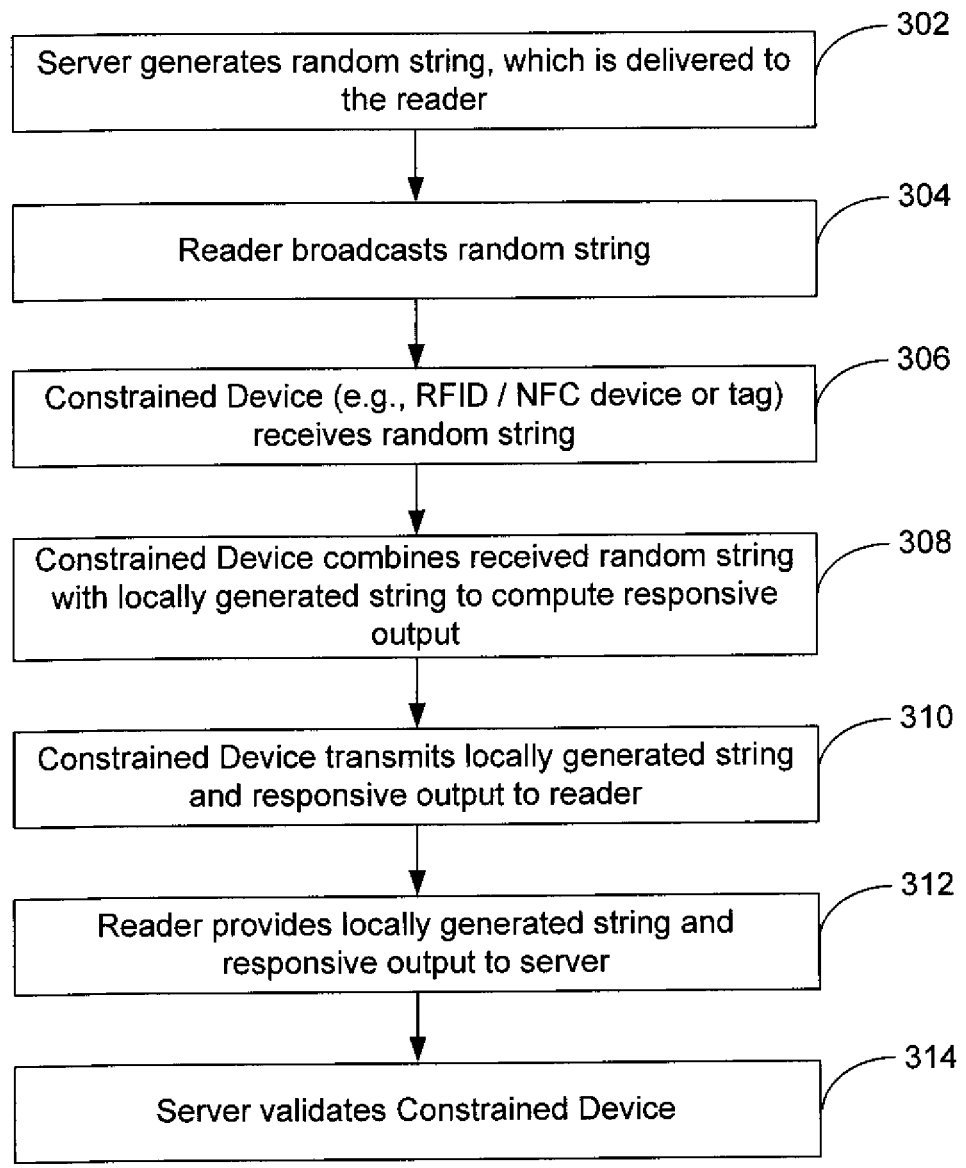
FIG. 3 illustrates an example flow diagram for an alternative authentication protocol for constrained devices that require anonymity, according to an embodiment of the invention.

FIG. 3 illustrates an example flow diagram for an alternative authentication protocol for constrained devices such as RFID devices/tags 108a-c or NFC devices/tags 110a-c that require anonymity, according to an embodiment of the invention. Initially, as similarly described above, the server 102 may generate a random string $r_{sys}{}^t$, which may be delivered to at least one of the readers/interrogators 106 (block 302). The readers/interrogators 104, 106 may subsequently transmit or broadcast the random string $r_{sys}{}^t$ to one or more RFID devices/tags 108a-c or NFC devices/tags 110a-c within the vicinity (block 304). One or more of the RFID devices/tags 108a-c or NFC devices/tags 110a-c may receive the random string $r_{sys}{}^t$ (block 306). As described above, the server 102 may update the value of the random string $r_{sys}{}^t$ periodically. For example, if the server 102 is expected to poll for one or more RFID devices/tags 108a-c or NFC devices/tags 110a-c at a rate of twice per minute, then the value of the random string $r_{sys}{}^t$ may be updated at least twice per minute. According to an example embodiment of the invention, the random string $r_{sys}{}^t$ may be an alphanumeric or binary string, generated by one or more random or pseudo-random generators, including a hash function.

In block 308, the RFID device/tag 108a-c or NFC device/tag 110a-c may then retrieve a locally generated string $r_i$, which may be updated periodically, and combines it with the received random string $r_{sys}{}^t$, where the combined string is used in calculating a responsive output $h_0 = F_{K_i}(r_{sys}{}^t, r_i)$, where $K_i$ is the private key stored with the respective RFID device/tag 108a-c or NFC device/tag 110a-c and function $F_{K_i}(\bullet)$ may be a deterministic function, including a member function of the MAC function family described above or a member function of a pseudo-random function (PRF) family. Generally, with a PRF family, no efficient algorithm may be able to distinguish between a function chosen randomly from the PRF family and a function whose outputs are completely random. According to an embodiment of the invention, a PRF family may be constructed from a cascade construction of a pseudo-random function generator such that described in "Oded Goldreich, Shari Goldwasser, and Silvio Micali. How to Construct Random Functions, In *Journal of the ACM, vol.* 33, no. 4, pp. 792-807. ACM Press, October 1986," which is hereby incorporated by reference. The pseudo-random function generators used in constructing the PRF family may comprise linear feedback shift registers or a cipher (e.g., stream cipher, etc.) that generates a keystream, which comprises a stream of random or pseudo-random characters. According to another embodiment of the invention, the PRF may include one or more block cipher cryptographic (e.g., encryption or decryption) functions. According to yet another embodiment of the invention, the PRF may comprise one-way functions (OWFs), which are functions that are easy to compute but hard to invert. If an OWF is utilized as the function $F_{K_i}(\bullet)$ for determining the responsive output $h_0$, then the input into the OWF may be a single concatenated input that includes the combined string (locally generated string $r_i$ and received random string $r_{sys}{}^t$) and the private key $K_i$ stored with the respective RFID device/tag 108a-c or NFC device/tag 110a-c). It will be appreciated that the value of the responsive output $h_0$, which is based upon the value of the function $F_{K_i}(\bullet)$, may be calculated by the RFID device tag 108a-c or NFC device/tag 110a-c using simple arithmetic operations or computationally inexpensive operations, according to an example embodiment of the invention.

Having determined the responsive output $h_0$, the RFID device/tag 108a-c or NFC device/tag 110a-c may then transmit the locally generated string $r_i$ and the responsive output $h_0$ to the reader/interrogator 104, 106 (block 310), which provides the received information to the server 102 (block 312). As illustrated in block 312, the server 102 may then attempt to validate the RFID device/tag 108a-c or NFC device/tag 110a-c based upon the received locally generated string $r_i$ and the responsive output $h_0$. In particular, the server 102 may include a lookup table or other database that includes an expected value of the locally generated string r, that cross-references to private key $K_i$. Assuming that the received value of the locally generated string $r_i$ matches the expected value of locally generated string $r_i$ in the look-up table or database, then the server 102 may know which private key $K_i$ to use when calculating its validation output $h_1$ according to $h_1=F_{K_i}(r_{sys}{}^t,r_i)$, where function $F_{K_i}(\cdot)$ may correspond to the same function for the respective RFID device/tag 108*a-c* or NFC device/tag 110*a-c*, the random string $r_{sys}{}^t$ was the string transmitted or broadcasted by the server 102, and the locally generated string $r_i$ was received from the respective RFID device/tag 108*a-c* or NFC device/tag 110*a-c*. If the value of the received responsive output $h_0$ matches the value of the validation output $h_1$ calculated by the server 102, then the RFID device/tag 108*a-c* or NFC device/tag 110*a-c* may be considered validated, as illustrated in block 314. The server 102 may also update the next expected value of locally generated string $r_i$ for the key $K_i$ in the lookup table by $r_i=F_{K_i}(r_i)$. According to an embodiment of the invention, $F_{K_i}(\cdot)$ may be a member function of a MAC function family, as described above. According to another embodiment of the invention, the locally generated string may be updated based upon information (e.g., an algorithm) shared between the RFID device/tag 108*a-c* or NFC device/tag 110*a-c* and the server 102. In addition, the server 102 may also store an indication that the RFID device/tag 108*a-c* or NFC device/tag 110*a-c* has been validated for purposes of tracking, identification, anti-counterfeiting, concurrent presence applications, and yet other applications.

However, if the received value of the locally generated string $r_i$ does not match any of the expected values of the locally generated string $r_i$ in the look-up table or database, then the server 102 may have to exhaustively search through all private keys $K_i$, at least one of which match the private key $K_i$ of any authentic RFID device/tag 108*a-c* or NFC device/tag 110*a-c*, and compute the value of the validation output $h_1=F_{K_i}(r_{sys}{}^t,r_i)$ to locate the private key $K_i$ that yields a correct validation output $h_1$ corresponding to the received responsive output $h_0$. The lookup table or database on the server 102 may then be synchronized to update its next expected value of the locally generated string $r_i$ for the located private key $K_i$ according to $r_i=F_{K_i}(r_i)$. According to another embodiment of the invention, the locally generated string may be updated based upon information (e.g., an algorithm) shared or synchronized between the RFID device/tag 108*a-c* or NFC device/tag 110*a-c* and the server 102.

On the other hand, if the server 102 exhaustively searches through all private keys $K_i$ and none of the computed values of the validation output $h_1=H_{K_i}(r_{sys}{}^t,r_i)$ correspond to the received responsive output $h_0$, then the server 102 will not be able to validate the transmitting RFID device/tag 108*a-c* or NFC device/tag 110*a-c*.

Figure 4A:
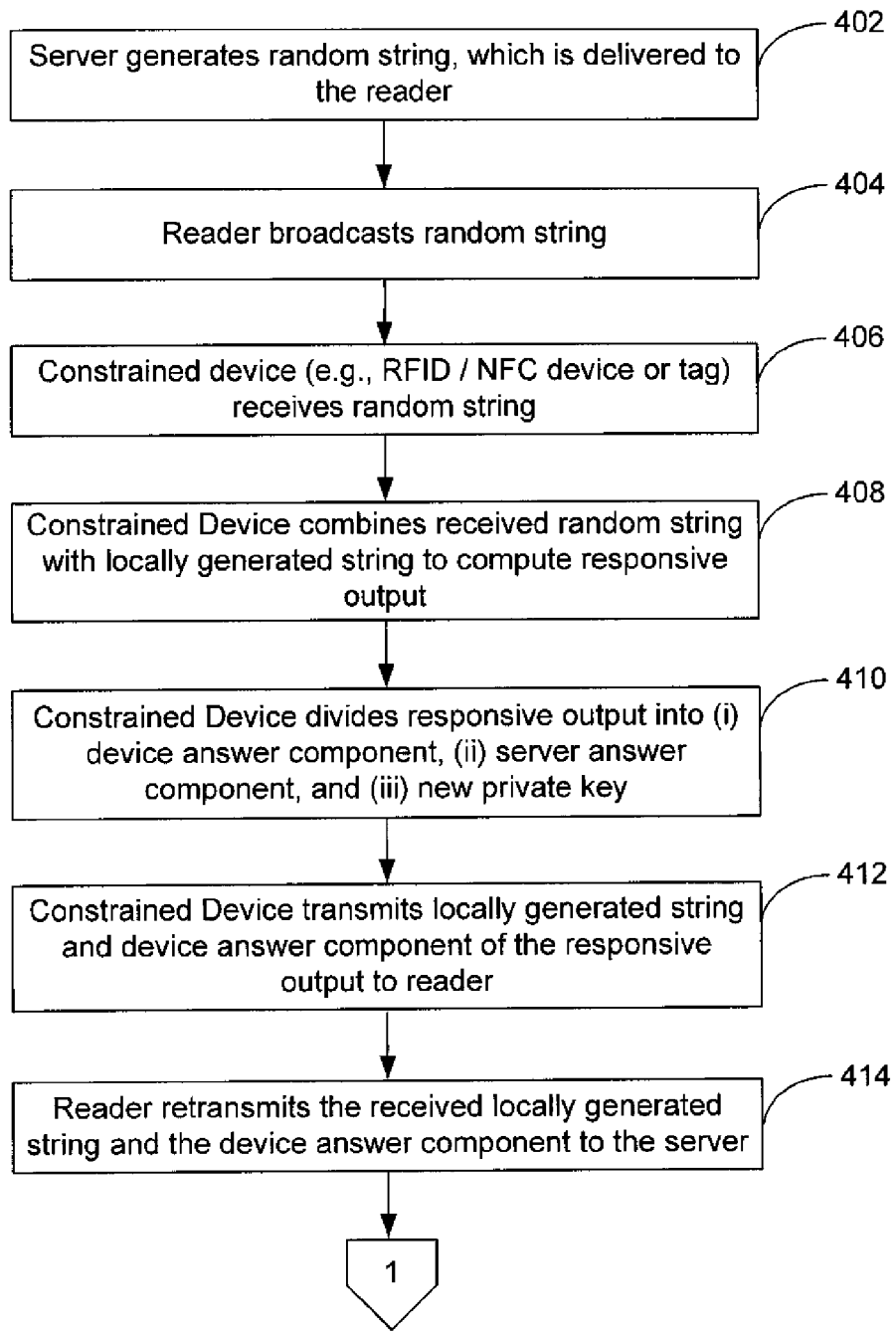
FIGS. 4A and 4B illustrate another example flow diagram for an alternative embodiment of the invention which, in addition to providing anonymity for constrained devices, also provides for updating private keys of the constrained devices.
Figure 4B:
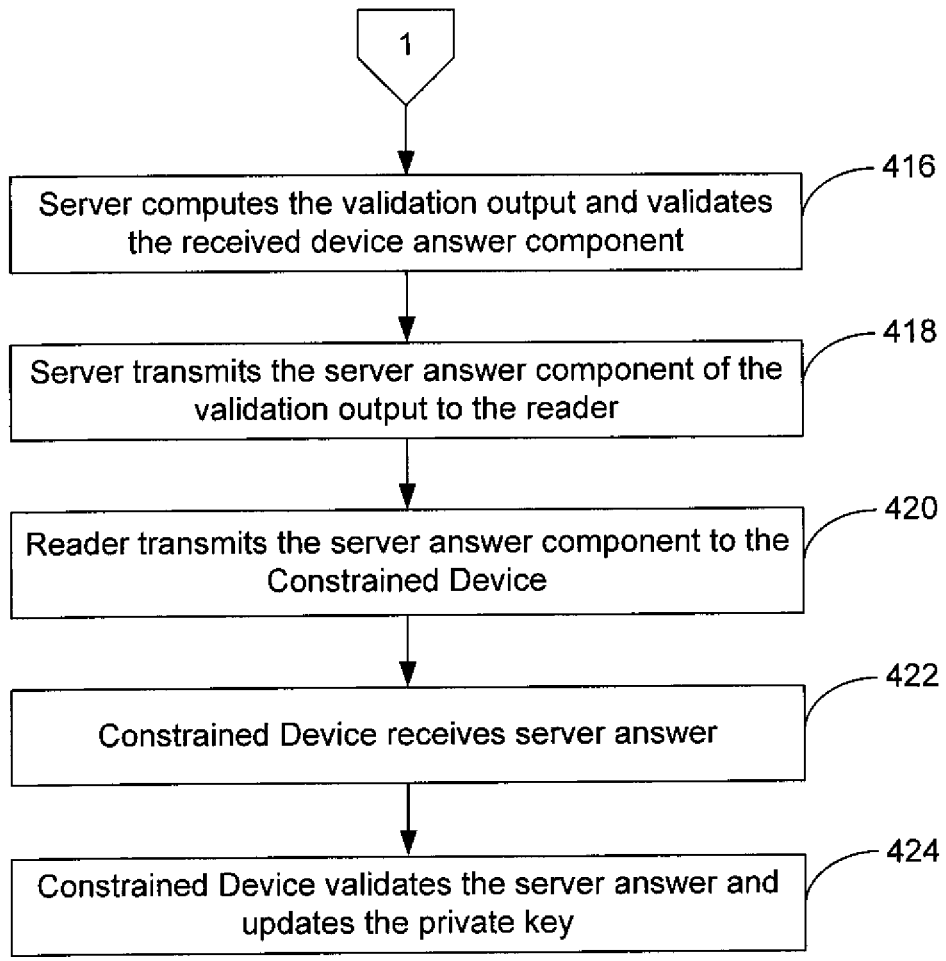

FIGS. 4A and 4B illustrate another example flow diagram for an alternative authentication protocol, which in addition to providing anonymity for constrained devices such as RFID devices/tags 108*a-c* or NFC devices/tags 110*a-c*, also provides for updating private keys of the constrained devices. This alternative embodiment can tolerate private key leakage events (e.g., through unauthorized manipulation of tags).

For example, consider the scenario where the private keys, or information about the keys, of one or more of the RFID devices/tags 108*a-c* or NFC devices/tags 110*a-c* are compromised to an unauthorized party A. However, in accordance with the protocol of FIGS. 4A and 4B, since the private keys of the devices/tags 108*a-c* or NFC devices/tags 110*a-c* have been modified in the intervening time and the compromised older private keys are no longer registered with or recognized by the server 102, the unauthorized Party A cannot utilize the obtained knowledge or partial knowledge of the compromised keys to impersonate or mimic the devices/tags 108*a-c* or NFC devices/tags 110*a-c*, or otherwise violate the claimed security properties of the system. This property may sometimes be referred to as "forward secrecy."

Turning now to FIG. 4A, in block 402, the server 102 starts by generating a random string $r_{sys}{}^t$, which is delivered to at least one of the readers/interrogators 104, 106. The readers/interrogators 104, 106 may transmit or broadcast the random string $r_{sys}{}^t$ to one or more RFID devices/tags 108*a-c* or NFC devices/tags 110*a-c* within their vicinity (block 404). At least one of the RFID devices/tags 108*a-c* or NFC devices/tags 110*a-c* may receive the transmitted or broadcasted random string $r_{sys}{}^t$ (block 406). As described above, the server 102 may update the value of the random string $r_{sys}{}^t$ periodically. For example, if the server 102 is expected to poll for one or more RFID devices/tags 108*a-c* or NFC devices/tags 110*a-c* at a rate of once every ten seconds, then the value of the random string $r_{sys}{}^t$ may be updated at least once per ten seconds. According to an example embodiment of the invention, the random string $r_{sys}{}^t$ may be an alphanumeric or binary string, generated by one or more random or pseudo-random generators, including a hash function.

In block 408, the RFID device/tag 108*a-c* or NFC device/tag 110*a-c* may then retrieve a locally generated string $r_i$, which may be updated periodically, and combine it with the received random string $r_{sys}{}^t$, where the combined string is used in calculating a responsive output $h_0=F_{K_i}(r_{sys}{}^t,r_i)$, where $K_i$ is the private key stored with the respective RFID device/tag 108*a-c* or NFC device/tag 110*a-c* and function $F_{K_i}(\cdot)$ may be a deterministic function, including a member function of a MAC function family or a pseudo-random function (PRF) family, as described earlier. It will be appreciated that the value of the responsive output $h_0$, which is based upon the value of the function $F_{K_i}(\cdot)$, may be calculated by the RFID device tag 108*a-c* or NFC device/tag 110*a-c* using simple arithmetic operations or computationally inexpensive operations, according to an example embodiment of the invention.

Having determined the responsive output $h_0$, the RFID device/tag 108*a-c* or NFC device/tag 110*a-c* may then split, divide, or otherwise logically apportion the responsive output $h_0$ into a plurality of components (block 410). According to an example embodiment of the invention, the responsive output $h_0$ may be split, divided, or logically apportioned into at least (i) the device answer component, (ii) the server answer component, and (iii) a new private key. According to an example embodiment of the invention, the device answer component may be transmitted to the server 102 and serve as a response to the random string $r_{sys}{}^t$ from the server 102. The server answer component may serve as a validator value for the server 102. Likewise, the new private key may be used to update or otherwise substitute the current value of the private key for the RFID device/tag 108*a-c* or NFC device/tag 110*a-c*.

The RFID device/tag 108*a-c* or NFC device/tag 110*a-c* then may transmit its locally generated string $r_i$ and the device answer component of the responsive output $h_0$ to the reader/interrogator 104, 106 (block 412), which provides or retransmits the received information to the server 102 (block 414).

Turning now to FIG. 4B, as illustrated in block 416, the server 102 then attempts to validate the RFID device/tag 108*a-c* or NFC device/tag 110*a-c* based upon the received locally generated string $r_i$ and the device answer component of the responsive output $h_0$. In particular, the server 102 may include a lookup table or database that includes an expected value of the locally generated string $r_i$ that cross-references to one or more private key(s) $K_i$. Assuming that the received value of the locally generated string $r_i$ matches the expected value of the locally generated string $r_i$ in the look-up table or database, then the server 102 may know which private key(s) $K_i$ to use when calculating its validation output $h_1$ according to $h_1 = F_{K_i}(r_{sys}{}^t, r_i)$, where function $F_{K_i}(\bullet)$ may correspond to the same function for the respective RFID device/tag 108a-c or NFC device/tag 110a-c, the random string $r_{sys}{}^t$ was the string transmitted or broadcasted by the server 102, and the locally generated string $r_i$ was received from the respective RFID device/tag 108a-c or NFC device/tag 110a-c. According to an example embodiment of the invention, the look-up table or database may cross reference the expected value of the locally generated string $r_i$ to both a prior value of the private key $K_i$ and a current value of the private key $K_i$. As will be described in further detail below, the server 102 may need to calculate the validation output $h_1$ using the prior value of the private key $K_i$ in the event the respective RFID device/tag 108a-c or NFC device/tag 110a-c did not update its private key from a prior communication session with the server 102, perhaps due to a temporary or transient hardware or communications error.

Once the server 102 has calculated the validation output $h_1$, the server may likewise split, divide, or logically apportion the validation output $h_1$ into at least (i) a device answer component, (ii) a server answer component, and (iii) a new private key. According to an embodiment of the invention, the server 102 may split, divide, or logically apportion the validation output $h_1$ according to the same or substantially similar manner or algorithm in which the RFID device/tag 108a-c or NFC device/tag 110a-c split, divided, or logically apportioned the responsive output $h_0$. If the value of the received device answer component of the responsive output $h_0$ matches the server 102 determined value of the device answer component of the validation output $h_1$, then the RFID device/tag 108a-c or NFC device/tag 110a-c may be considered validated, as illustrated in block 416. The server 102 may also update the next expected value of the locally generated string $r_i$ for the key $K_i$ in the lookup table by $r_i = F_{K_i}(r_i)$. According to another embodiment of the invention, the locally generated string may be updated based upon information (e.g., an algorithm) shared or synchronized between the RFID device/tag 108a-c or NFC device/tag 110a-c and the server 102. However, if the received value of the locally generated string $r_i$ does not match any of the expected values of the locally generated string $r_i$ in the look-up table or database, then the server 102 may have to exhaustively search through all private keys $K_i$, perhaps including prior values of private keys $K_i$, at least one of which may match the private key $K_i$ of any authentic RFID device/tag 108a-c or NFC device/tag 110a-c, and compute the value of the validation output $h_1 = F_{K_i}(r_{sys}{}^t, r_i)$ to locate the private key $K_i$ that yields a device answer component matching the received device answer component. If a match is found, then the RFID device/tag 108a-c or NFC device/tag 110a-c may be validated, and the lookup table or database on the server 102 may then be synchronized to update its next expected value of the locally generated string $r_i$ for the located private key $K_i$. On the other hand, if the server 102 exhaustively searches through all private keys $K_i$ and none of the computed values of the validation output $h_1 = F_{K_i}(r_{sys}{}^t, r_i)$ provide a device answer component matching the received device answer component, then the server 102 will not be able to validate the transmitting RFID device/tag 108a-c or NFC device/tag 110a-c.

According to an example embodiment of the invention, if the server 102 succeeded in validating the RFID device/tag 108a-c or NFC device/tag 110a-c, then the server 102 may also update its lookup table or database to include the updated private key determined from the component of the validation output $h_1$. Additionally, the server may also retain at least one prior private key $K_i$ that was updated in addition to the new private key.

According to an alternative embodiment of the invention, the server 102 may update the private key $K_i$ for the RFID device/tag 108a-c or NFC device/tag 110a-c with the new private key obtained as a component of the previously calculated validation output $h_1$ during the next interaction with the same RFID device/tag 108a-c or NFC device/tag 110a-c, and then only if the new key value is being used as current by the device/tag 108a-c, 110a-c (block 416). This precludes that the server 102 and the RFID device/tag 108a-c or NFC device/tag 110a-c reaching a state where the key stored for the device/tag 108a-c, 110a-c at the server 102 and the key stored in the RFID device/tag 108a-c or NFC device/tag 110a-c differ.

In block 418, once the server 102 succeeds in validating the RFID device/tag 108a-c or NFC device/tag 110a-c, it may then transmit the server answer component of the determined validation output $h_1$ to the reader/interrogator 104, 106. The reader/interrogator 104, 106 may then simply broadcast or transmit the server answer component to the RFID devices/tags in its vicinity (block 420). If the device/tag 108a-c or NFC device/tag 110a-c that participated previously in blocks 206-210 is still within range of the reader/interrogator 104, 106, it will receive the transmitted or broadcasted server answer component of the validation output $h_1$ calculated by the server 102 (block 422). Assuming that the received server answer component matches its own server answer component, the RFID device/tag 108a-c or NFC device/tag 110a-c may then update its current private key with the new private key obtained as a component from the previously responsive output $h_0$ (block 424). It will also be appreciated that in other embodiments of the invention, the server 102 and/or device/tag 108a-c, 110a-c may determine a new value for the private keys based upon a pseudo-random function of the information that the server 102 and the device/tag 108a-c, 110a-c share.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for secure authentication, comprising:
receiving, by a constrained device, a random string transmitted from a server;
determining, by the constrained device, a responsive output by evaluating a first deterministic function including first inputs to the first deterministic function, the first inputs comprising the received random string, a locally generated string, and a first private key stored on the constrained device;
transmitting at least one portion of the responsive output and the locally generated string from the constrained device to a server;
determining, by the server, a validation output by evaluating a second deterministic function including second inputs to the second deterministic function, the second inputs comprising the random string, the locally generated string, and a second private key of a plurality of private keys stored on the server; and authenticating the constrained device based upon the server matching the transmitted at least one portion of the responsive output to at least a portion of the validation output;

transmitting a server answer component of the validation output to the constrained device;

matching, at the constrained device, the received server answer component to a server answer component of the responsive output; and updating the first private key and the second private key;

wherein the first private key is updated based upon a new private key of the responsive output, and wherein the second private key is updated based upon a new private key of the validation output.

2. The method of claim 1, wherein the constrained device comprises a radio frequency identification (RFID) device or a near field communication (NFC) device.

3. The method of claim 1, wherein the first deterministic function and the second deterministic function include at least one message authentication code (MAC) function or at least one pseudo-random function (PRF).

4. The method of claim 3, wherein the at least one pseudo-random function (PRF) comprises one of (i) at least one pseudo-random generator that includes linear feedback shift registers or a stream cipher that generates a keystream, (ii) at least one one-way function (OWF), or (iii) at least one block cipher cryptographic function.

5. The method of claim 1, wherein the second private key is of a same value as the first private key, and wherein the server selects the second private key based at least in part on one of (i) an identification code transmitted from the constrained device to the server, or (ii) the locally generated string value transmitted from the constrained device to the server.

6. The method of claim 1, wherein the constrained device periodically updates the locally generated string, wherein the updated locally generated string is based at least in part upon at least one of (i) a previous value of the locally generated string, or (ii) information shared or synchronized between the constrained device and the server.

7. The method of claim 1, wherein the responsive output and the validation output each respectively include a device answer component, a server answer component, and a new private key, wherein the transmitted at least one portion of the responsive output includes the device answer component, and wherein the server authenticates the constrained device by matching the device answer component of the responsive output to the device answer component of the validation output.

8. The method of claim 1, wherein the second private key is determined based at least in part on an association between the plurality of keys and a respective plurality of expected values stored on the server device.

9. The method of claim 8, wherein at least one expected value of the plurality of expected values matches the locally generated string.

10. A system for a secure authentication, comprising:
a wireless constrained device that includes an antenna, a first memory for storing first computer-executable instructions, and a first processor in communication with the antenna and the first memory, wherein the first processor is operable to execute the first computer-executable instructions to:
receive a random string,
determine a responsive output by evaluating a first deterministic function including first inputs to the first deterministic function, the first inputs comprising the received random string, a locally generated string, and a first private key stored on the constrained device, and
transmit at least one portion of the responsive output and the locally generated string; and
a server having a second memory for storing second computer-executable instructions, and a second processor in communication with the second memory, wherein the second processor is operable to execute the second computer-executable instructions to:
transmit the random string to the constrained device,
receive the at least one portion of the responsive output and the locally generated string transmitted from constrained device,
determine a validation output by evaluating a second deterministic function including second inputs to the second deterministic function, the second inputs comprising the random string, the locally generated string, and a second private key of a plurality of private keys stored in the second memory, and
authenticate the constrained device based upon the received at least one portion of the responsive output matching at least a portion of the validation output;
wherein the server is operative to transmit a server answer component of the validation output to the constrained device, wherein the constrained device is operative to match the received server answer component to a server answer component of the responsive output, and based upon the match, update the first private key based upon a new private key of the responsive output, and wherein the second private key is updated based upon a new private key of the validation output.

11. The system of claim 10, wherein the constrained device comprises a radio frequency identification (RFID) device or a near field communication (NFC) device.

12. The system of claim 10, wherein the first deterministic function and the second deterministic function include at least one message authentication code (MAC) function or at least one pseudo-random function (PRF).

13. The system of claim 12, wherein the at least one pseudorandom function (PRF) comprises one of (i) at least one pseudo-random generator that includes linear feedback shift registers or a stream cipher that generates a keystream, (ii) at least one one-way function (OWF), or (iii) at least one block cipher cryptographic function.

14. The system of claim 10, wherein the second private key is of a same value as the first private key, and wherein the server is operative to select the second private key based at least in part on one of (i) an identification code transmitted from the constrained device to the server, and (ii) the locally generated string value transmitted from the constrained device to the server.

15. The system of claim 10, wherein the constrained device is operative to periodically update the locally generated string, wherein the updated locally generated string is based at least in part upon at least one of (i) a previous value of the locally generated string, and (ii) information shared or synchronized between the constrained device and the server.

16. The system of claim 10, wherein the responsive output and the validation output each respectively include a device answer component, a server answer component, and a new private key, wherein the transmitted at least one portion of the responsive output from the constrained device includes the device answer component, and wherein the server is operative to authenticate the constrained device by matching the device answer component of the responsive output to the device answer component of the validation output.

17. An authentication method, comprising:
- receiving, at a wireless constrained device, a random string broadcast from a server via a reader;
- retrieving a locally generated string at the wireless constrained device;
- determining an output for a message authentication code (MAC) function or a pseudo-random function (PRF) including first inputs to the MAC function or the PRF, the first inputs comprising the received random string, a locally generated string, and a private key stored on the wireless constrained device; and
- transmitting at least one portion of the MAC function or PRF output and the locally generated string from the constrained device to the server, wherein validation of the constrained device occurs by the server determining the private key stored on the wireless constrained device and verifying the received at least one portion of the MAC function or PRF including second inputs to the MAC function or the PRF, the second inputs comprising the random string, the locally generated string, and the determined private key;
- transmitting, from the server to the constrained device, a server answer component of an output associated with the validation;
- matching, at the constrained device, the received server answer component to a server answer component of the determined output; and
- updating the private key stored on the constrained device and the determined private key;
- wherein the private key on the constrained device is updated based upon a new private key of the determined output, and wherein the determined private key is updated based upon a new private key of the output associated with the validation.

18. The authentication method of claim 17, wherein the constrained device includes one of a radio frequency identification (RFID) device, a near field communication (NFC) device, a wireless smart card, or a wireless sensor node.

* * * * *